United States Patent
Suleiman et al.

(10) Patent No.: US 11,308,049 B2
(45) Date of Patent: Apr. 19, 2022

(54) METHOD AND SYSTEM FOR ADAPTIVELY REMOVING OUTLIERS FROM DATA USED IN TRAINING OF PREDICTIVE MODELS

(71) Applicant: Oracle International Corporation, Redwood Shores, CA (US)

(72) Inventors: Yaser I. Suleiman, Santa Clara, CA (US); Michael Zoll, Foster City, CA (US); Subhransu Basu, Fremont, CA (US); Angelo Pruscino, Los Altos, CA (US); Wolfgang Lohwasser, Munich (DE); Wataru Miyoshi, Redwood City, CA (US); Thomas Breidt, Munich (DE); Thomas Herter, Santa Clara, CA (US); Klaus Thielen, Munich (DE); Sahil Kumar, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 720 days.

(21) Appl. No.: 15/707,454

(22) Filed: Sep. 18, 2017

(65) Prior Publication Data

US 2018/0081913 A1    Mar. 22, 2018

Related U.S. Application Data

(60) Provisional application No. 62/395,845, filed on Sep. 16, 2016.

(51) Int. Cl.
*G06F 16/21* (2019.01)
*G06F 16/215* (2019.01)
(Continued)

(52) U.S. Cl.
CPC ........ *G06F 16/215* (2019.01); *G06F 11/3409* (2013.01); *G06F 11/3452* (2013.01);
(Continued)

(58) Field of Classification Search
CPC ............... G06F 16/215; G06F 11/3452; G06F 11/3409; H04L 43/02; H04L 41/142;
(Continued)

(56) References Cited

U.S. PATENT DOCUMENTS 5,408,406 A   4/1995 Mathur et al.
5,477,449 A   12/1995 Lino
(Continued)

FOREIGN PATENT DOCUMENTS

EP    1717736 A2    11/2006
WO    WO 2004053659 A2    6/2004
WO    WO 2016086138 A1    6/2016

OTHER PUBLICATIONS

Collins, et al. "External validation of multivariable prediction models: a systematic review of methodological conduct and reporting", BMC Medical Research Methodology, Mar. 2014.
(Continued)

*Primary Examiner* — Alicia M Willoughby
(74) *Attorney, Agent, or Firm* — Vista IP Law Group, LLP

(57) ABSTRACT

Described is an improved approach to remove data outliers by filtering out data correlated to detrimental events within a system. One or more detrimental even conditions are defined to identify and handle abnormal transient states from collected data for a monitored system.

19 Claims, 8 Drawing Sheets

(51) Int. Cl.
  *G06K 9/62*    (2022.01)
  *G06F 11/34*   (2006.01)
  *G06N 20/20*   (2019.01)
  *H04L 41/142*  (2022.01)
  *G06N 7/00*    (2006.01)
  *H04L 41/069*  (2022.01)
  *G06N 20/00*   (2019.01)
  *H04L 41/0695* (2022.01)
  *H04L 41/0823* (2022.01)
  *H04L 43/02*   (2022.01)

(52) U.S. Cl.
  CPC ........... *G06K 9/6256* (2013.01); *G06N 7/005* (2013.01); *G06N 20/20* (2019.01); *H04L 41/069* (2013.01); *H04L 41/142* (2013.01); *G06N 20/00* (2019.01); *H04L 41/0695* (2013.01); *H04L 41/0823* (2013.01); *H04L 43/02* (2013.01)

(58) Field of Classification Search
  CPC .............. H04L 41/069; H04L 41/0695; H04L 41/0823; G06N 20/20; G06N 7/005; G06N 20/00; G06K 9/6256
  See application file for complete search history.

(56) References Cited

U.S. PATENT DOCUMENTS

| | | | |
|---|---|---|---|
| 6,144,952 A | 11/2000 | Keeler et al. | |
| 6,314,414 B1 | 11/2001 | Keeler et al. | |
| 7,006,900 B2 | 2/2006 | Zhenduo et al. | |
| 7,333,917 B2 | 2/2008 | Greis et al. | |
| 7,346,471 B2 | 3/2008 | Chickering et al. | |
| 7,379,846 B1 | 5/2008 | Williams et al. | |
| 7,457,763 B1 | 11/2008 | Garrow et al. | |
| 7,599,893 B2 | 10/2009 | Sapir et al. | |
| 7,690,037 B1* | 3/2010 | Hartmann | G06F 21/552 726/22 |
| 7,702,598 B2 | 4/2010 | Saidi et al. | |
| 7,725,300 B2 | 5/2010 | Pinto et al. | |
| 7,730,003 B2 | 6/2010 | Pinto et al. | |
| 7,801,839 B2 | 9/2010 | Kates et al. | |
| 7,882,394 B2 | 2/2011 | Hosek et al. | |
| 8,001,527 B1 | 8/2011 | Qureshi et al. | |
| 8,140,421 B1 | 3/2012 | Humphries et al. | |
| 8,195,582 B2 | 6/2012 | Niemasik et al. | |
| 8,214,308 B2 | 7/2012 | Chu | |
| 8,244,654 B1 | 8/2012 | Hobgood et al. | |
| 8,364,613 B1 | 1/2013 | Lin et al. | |
| 8,370,280 B1 | 2/2013 | Lin et al. | |
| 8,374,974 B2 | 2/2013 | Chen et al. | |
| 8,655,698 B2 | 2/2014 | West, II et al. | |
| 8,706,659 B1 | 4/2014 | Mann et al. | |
| 8,712,929 B1* | 4/2014 | Bickford | G01D 3/022 706/12 |
| 8,732,222 B2 | 5/2014 | Horvitz et al. | |
| 8,843,423 B2 | 9/2014 | Chu et al. | |
| 8,843,427 B1 | 9/2014 | Lin et al. | |
| 9,141,911 B2 | 9/2015 | Zhao et al. | |
| 9,229,838 B2 | 1/2016 | Chang et al. | |
| 9,239,986 B2 | 1/2016 | Lin et al. | |
| 9,262,493 B1 | 2/2016 | Dietrich | |
| 9,285,504 B2 | 3/2016 | Dannevik et al. | |
| 9,349,103 B2 | 5/2016 | Eberhardt et al. | |
| 9,349,105 B2 | 5/2016 | Beymer et al. | |
| 9,419,917 B2 | 8/2016 | Eaton et al. | |
| 9,443,194 B2 | 9/2016 | Chu et al. | |
| 9,467,355 B2 | 10/2016 | Doering et al. | |
| 9,489,630 B2 | 11/2016 | Achin et al. | |
| 9,501,541 B2 | 11/2016 | Doering et al. | |
| 9,536,052 B2 | 1/2017 | Amarasingham et al. | |
| 9,542,400 B2 | 1/2017 | Doering et al. | |
| 9,605,704 B1 | 3/2017 | Humphries et al. | |
| 9,619,540 B2 | 4/2017 | Prathipati et al. | |
| 9,621,435 B2 | 4/2017 | Vasudevan et al. | |
| 9,652,714 B2 | 5/2017 | Achin et al. | |
| 9,659,254 B2 | 5/2017 | Achin et al. | |
| 9,667,470 B2 | 5/2017 | Prathipati et al. | |
| 9,717,439 B2 | 8/2017 | Giftakis et al. | |
| 9,838,370 B2 | 12/2017 | Doering et al. | |
| 10,409,817 B1* | 9/2019 | Dias | G06F 16/2477 |
| 2003/0110007 A1 | 6/2003 | Mcgee et al. | |
| 2003/0139908 A1 | 7/2003 | Wegerich et al. | |
| 2004/0167765 A1 | 8/2004 | Ata | |
| 2005/0134284 A1 | 6/2005 | Hoff et al. | |
| 2005/0234688 A1 | 10/2005 | Pinto | |
| 2006/0058898 A1* | 3/2006 | Emigholz | C10G 11/187 700/29 |
| 2006/0059253 A1 | 3/2006 | Goodman et al. | |
| 2006/0064415 A1 | 3/2006 | Guyon et al. | |
| 2006/0173663 A1 | 8/2006 | Langheier et al. | |
| 2006/0247798 A1 | 11/2006 | Subbu et al. | |
| 2006/0248031 A1 | 11/2006 | Kates et al. | |
| 2008/0097637 A1* | 4/2008 | Nguyen | G05B 23/0254 700/110 |
| 2008/0281557 A1* | 11/2008 | Emigholz | G05B 23/0281 702/179 |
| 2009/0055139 A1 | 2/2009 | Agarwal | |
| 2009/0216393 A1* | 8/2009 | Schimert | G05B 23/0251 701/14 |
| 2010/0063948 A1 | 3/2010 | Virkar et al. | |
| 2010/0070343 A1* | 3/2010 | Taira | G06Q 30/0282 705/400 |
| 2012/0051228 A1 | 3/2012 | Shuman et al. | |
| 2012/0136896 A1 | 5/2012 | Tseng | |
| 2012/0215664 A1* | 8/2012 | Dalal | G06Q 30/06 705/27.1 |
| 2012/0266101 A1 | 10/2012 | Shah | |
| 2013/0036082 A1 | 2/2013 | Natarajan | |
| 2013/0226842 A1 | 8/2013 | Chu | |
| 2013/0303391 A1 | 11/2013 | Li et al. | |
| 2014/0058763 A1 | 2/2014 | Zizzamia et al. | |
| 2014/0046879 A1 | 3/2014 | MacLennan et al. | |
| 2014/0114746 A1 | 4/2014 | Pani et al. | |
| 2014/0172371 A1 | 6/2014 | Zhu et al. | |
| 2014/0207493 A1 | 7/2014 | Sarrafzadeh | |
| 2014/0222736 A1 | 8/2014 | Drew | |
| 2014/0258187 A1* | 9/2014 | Suleiman | G06N 20/00 706/12 |
| 2014/0281739 A1 | 9/2014 | Tuffs et al. | |
| 2014/0316220 A1 | 10/2014 | Sheldon | |
| 2014/0343955 A1 | 11/2014 | Raman | |
| 2014/0344186 A1 | 11/2014 | Nadler | |
| 2014/0344195 A1 | 11/2014 | Drew et al. | |
| 2014/0344208 A1 | 11/2014 | Ghasemzadeh et al. | |
| 2014/0372346 A1 | 12/2014 | Phillipps et al. | |
| 2014/0379310 A1 | 12/2014 | Ramachandran et al. | |
| 2015/0067411 A1 | 3/2015 | Xia | |
| 2016/0028599 A1 | 1/2016 | Vasseur et al. | |
| 2016/0077677 A1 | 3/2016 | Valdes | |
| 2016/0092557 A1 | 3/2016 | Stojanovic et al. | |
| 2016/0103838 A1 | 4/2016 | Sainani et al. | |
| 2016/0215996 A1 | 7/2016 | Blair et al. | |
| 2016/0267077 A1 | 9/2016 | Bahgat et al. | |
| 2016/0294614 A1 | 10/2016 | Searle et al. | |
| 2016/0328406 A1 | 11/2016 | Convertino et al. | |
| 2016/0335550 A1 | 11/2016 | Achin et al. | |
| 2016/0359680 A1 | 12/2016 | Parandehgheibi et al. | |
| 2016/0371601 A1 | 12/2016 | Grove et al. | |
| 2017/0026312 A1* | 1/2017 | Hrischuk | H04L 67/1097 |
| 2017/0102982 A1 | 4/2017 | Kolandavelu et al. | |
| 2017/0169468 A1 | 6/2017 | Shuken et al. | |
| 2017/0186249 A1 | 6/2017 | Bandy et al. | |
| 2017/0220407 A1 | 8/2017 | Estrada et al. | |
| 2017/0245806 A1 | 8/2017 | Elhawary et al. | |
| 2017/0262596 A1 | 9/2017 | Sengupta | |
| 2017/0316586 A1 | 11/2017 | Ricci | |
| 2017/0353477 A1 | 12/2017 | Faigon et al. | |
| 2018/0052903 A1* | 2/2018 | Mercado | G06F 17/15 |

(56) References Cited

U.S. PATENT DOCUMENTS

2018/0068033 A1 3/2018 Bandyopadhyay
2018/0075175 A1* 3/2018 Chang ............... G06Q 40/025

OTHER PUBLICATIONS

Razzaghi, et al. "Multilevel Weighted Support Vector Machine for Classification on Healthcare Data with Missing Values", PLoS ONE, May 2016.
Lakshminarayan, et al. "Imputation of missing data using machine learning techniques" KDD'96 Proceedings of the Second International Conference on Knowledge Discovery and Data Mining, Aug. 1996, pp. 140-145.
Somasundaram, et al. "Radial Basis Function Network Dependent Exclusive Mutual Interpolation For Missing Value Imputation", Journal of Computer Science, Sep. 2013.
Zhang, et al. "How to evaluate model performance in Azure Machine Learning Studio", Microsoft Azure, Mar. 2017.
Kadane, et al. "Methods and Criteria for Model Selection", Journal of the American Statistical Association, vol. 99, 2004, p. 279-290.
Banaee, et al. "Data Mining for Wearable Sensors in Health Monitoring Systems: A Review of Recent Trends and Challenges" Sensors (Basel), Dec. 2013, pp. 17472-17500.
Ghanbari, et al. "Semantic-Driven Model Composition for Accurate Anomaly Diagnosis", Jun. 2008, IEEE, International Conference on Autonomic Computing.
Chen, et al. "Analysis of service diagnosis improvement through increased monitoring granularity" Springer US, Software Qual J, Jun. 2017.
Servicenow Inc., "Get to the Root of Your Business Service Quality Issues", 2015.
Dynatrace, "Root cause analysis of infrastructure issues", Retrieved on Feb. 2017 from https://help.dynatrace.com/monitorcloudvirtualizationandhosts/hosts/rootcauseanalysisofinfrastructureissues/.
Wagner, et al. "Measurement Adherence in the Blood Pressure Self-Measurement Room", Telemed J E Health, Nov. 2013, pp. 826-883.
Deshpande, B., "Why predictive maintenance is more relevant today than ever before", Soliton Technologies, Jan. 2014.
Sengupta, "Predictive Modeling: 'Ensemble of Ensemble'" Analytics Magazine, Nov./Dec. 2015.
Tim, "What is the proper name of a model that takes as input the output of another model?" Jan. 2015, from http://stats.stackexchange.com/questions/135427/what-is-the-proper-name-of-a-model-that-takes-as-input-the-output-of-another-mod.
Cherkassky, et al. "Multiple Model Estimation: A New Formulation for Predictive Learning" submitted to IEE Transaction on Neural Network, 2002.
Meng, et al. "Predictive Modeling Using SAS Visual Statistics: Beyond the Prediction" SAS Institute Inc., Sesug Proceedings 2015.
Tong, et al. "Decision Forest: Combining the Predictions of Multiple Independent Decision Tree Models" J. Chem. Inf. Comput. Sci., Feb. 2003, 43, pp. 525-531.
Yi, et al. "Predictive model performance: offline and online evaluations", ACM SIGKDD Conference, Aug. 2013, pp. 1294-1302.
Li, J. et al., "Machine learning based online performance prediction for runtime parallelization and task scheduling," 2009 IEEE International Symposium on Performance Analysis of Systems and Software, Boston, MA, (Apr. 2009).
Microstrategy Inc. "Inputs for predictive metrics", Advanced Reporting Guide: Enhancing Your Business Intelligence Application Version: 9.4, (Sep. 2016).
Subramanian, et al. "Differentially Sampled Anomaly Detection System based on Outlier Identification Technique" Nov. 2015, Indian Journal of Science and Technology, vol. 8(32).
Radoux, et al. "Automated Training Sample Extraction for Global Land Cover Mapping" Remote Sens. May 2014, pp. 3965-3987.
Stang, et al. "The Effect of Data Quality On Data Mining—Improving Prediction Accuracy By Generic Data Cleansing", In International Conference on Information Quality ICIQ, Jan. 2010.
Dienst, et al. "Automatic Anomaly Detection in Offshore Wind SCADA Data", Conference: Wind Europe Summit, Sep. 2016.
Munirathinam, et al. "Predictive Models for Equipment Fault Detection in the Semiconductor Manufacturing Process" IACSIT International Journal of Engineering and Technology, Aug. 2016, vol. 8, No. 4.
Notice of Allowance and Fee(s) dated May 1, 2019 for related U.S. Appl. No. 15/707,500.
Cox, B. G., et al. "Business Survey Methods". Wiley, Feb. 16, 1995.
Purwar, et al. "Hybrid prediction model with missing value imputation for medical data" Aug. 2015. Published in Journal Expert Systems with Applications: An International Journal, vol. 42 Issue 13, pp. 5621-5631.
Non-Final Office Action dated Jul. 25, 2019 for related U.S. Appl. No. 15/707,536.
Notice of Allowance and Fee(s) dated Nov. 29, 2019 for related U.S. Appl. No. 15/707,536.
Non-Final Office Action dated Nov. 15, 2019 for related U.S. Appl. No. 15/707,417.
Final Office Action dated Apr. 20, 2020 for related U.S. Appl. No. 15/707,417.
Notice of Allowance dated Apr. 8, 2020 for related U.S. Appl. No. 15/707,536.
Non-Final Office Action dated Apr. 16, 2020 for related U.S. Appl. No. 16/564,910.
Cox et al. Book entitled "Business Survey Methods", dated Sep. 20, 2011.
Nartgun et al., Article entitled "Comparison of the Various Methods Used in Solving Missing Data Problems", dated Apr. 2016.
Olinsky et al., Article entitled "The comparative efficacy of imputation methods for missing data in structural equation modeling", dated May 20, 2002.
Final Office Action dated Jul. 27, 2020 for related U.S. Appl. No. 16/564,910.
Newgard et al., Article entitled "Missing Data: What are You Missing?", dated May 2006.
Aittokallio, Article entitled "Dealing with Missing Values in Large-Scale Studies: Microarray Data Imputation and Beyond", Copyright 2009.
Notice of Allowance dated Sep. 16, 2020 for related U.S. Appl. No. 15/707,417.
Notice of Allowance dated Jan. 1, 2021 for related U.S. Appl. No. 15/707,536.
Non-Final Office Action dated Mar. 18, 2021 for related U.S. Appl. No. 16/564,910.
Final Office Action dated Jul. 26, 2021 for related U.S. Appl. No. 16/564,910.
Non-Final Office Action for U.S. Appl. No. 16/564,910 dated Jan. 25, 2022.
Article entitled "Applying a Neural Network to Recover Missed RFID Readings", by Darcy et al., dated 2010 (Year: 2010).
Article entitled "Best practices for missing data management in counseling psychology", by Schlomer, dated 2010 (Year: 2010).

* cited by examiner

502 → DEC = Event Name; Scope; Formula; Apply-Period

504 → DEC = parallel_recovery_coord_wait_for_reply;Global;[>=200];5:5

FIG. 5

METHOD AND SYSTEM FOR ADAPTIVELY REMOVING OUTLIERS FROM DATA USED IN TRAINING OF PREDICTIVE MODELS

CROSS-REFERENCE TO RELATED APPLICATIONS

The present application claims the benefit of priority to U.S. Provisional Application No. 62/395,845, filed on Sep. 16, 2016, which is hereby incorporated by reference in its entirety. The present application is related to U.S. application Ser. No. 15/707,417, entitled "METHOD AND SYSTEM FOR CLEANSING TRAINING DATA FOR PREDICTIVE MODELS", U.S. application Ser. No. 15/707,500, entitled "METHOD AND SYSTEM FOR ADAPTIVELY IMPUTING SPARSE AND MISSING DATA FOR PREDICTIVE MODELS", and U.S. application Ser. No. 15/707,536, entitled "METHOD AND SYSTEM FOR PERFORMING CONTEXT-AWARE PROGNOSES FOR HEALTH ANALYSIS OF MONITORED SYSTEMS", all of which are filed on even date herewith and which are hereby incorporated by reference in their entirety.

BACKGROUND

Database systems and database clusters are becoming increasingly larger and more complex. The horizontal expansion of computing component resources (e.g., more and more computing nodes, more and more storage-oriented devices, more and more communication paths between components, more and more processing modules and instances, etc.) coupled with the proliferation of high-performance component instrumentation results in systems capable of generating extremely high bandwidth streams of sensory data. Even a session of very short duration to capture such sensory data can result in an accumulation of correspondingly large volumes of raw data of very detailed complexity, which presents a large challenge to system administrators to perceive the meaning within the volume of data.

The problem is that given the size of modern database systems and clusters, it is becoming more and more difficult for administrators to efficiently manage the health and correct operational state of the technology given the quantities and complexities of data being collected for those databases. Conventional approaches often rely upon ad hoc logic that is notorious for having low-grade accuracy with regards to the current state of health of the system, and to then act upon their possibly inaccurate assessment of the state the of the system.

Machine learning has been proposed as a solution for managing and monitoring complex systems such as databases. Machine learning pertains to systems that allow a machine to automatically "learn" about a given topic, and to improve its knowledge of that topic over time as new data is gathered about that topic. The learning process can be used to derive an operational function that is applicable to analyze the data about that system, where the operational function automatically processes data that is gathered from the activity or system being monitored. This approach is useful, for example, when a vast amount of data is collected from a monitored system such that the data volume is too high for any manual-based approach to reasonably and effectively perform data review to identify patterns within the data, and hence automated monitoring is the only feasible way that can allow for efficient review of that collected data.

However, the quality of prediction results from applying machine learning is highly dependent upon the quality of the data that is provided to the machine learning system in the first place. If the input data is not a good representative for typical operating conditions of the target system to be analyzed, then any predictive model created by the machine learning process may not be able to provide accurate predictions for the target system. This type of situation may occur, for example, when data for a learning process is collected from a target system that appears like it is operating in a normal functioning state, but in reality certain events are occurring that are atypical for the system. The event may not be serious enough to cause the target system to be non-functional, but may nonetheless skew some or all of the collected data so that they are no longer representative of the normal operating conditions for the system.

Conventional machine learning approaches do not provide a robust automated solution to this issue. Instead, conventional approaches would necessitate the involvement of human experts that can recognize these situations, and to manually adjust the data and/or data collection process to account for this issue. For example, existing solutions typically require trained statisticians or data scientists with domain experience to manually validate each individual data point in the training dataset, and to interpret the mathematical outcomes of some domain-specific statistical tool for validation. This requirement may hamper the widespread adoption of machine learning solutions. Therefore, one main hurdle in the path for autonomous health monitoring products is the challenge to reduce the dependency on human expertise to interpret or administer machine learning model based solutions.

What is needed, is a method and/or system that overcomes the problems inherent in the prior approaches, and which permits automated removal of such outlier data.

SUMMARY

According to some embodiments, outliers are removed by filtering out data correlated to detrimental events within a system. One or more detrimental event conditions are defined to identify and handle abnormal transient states from collected data for a monitored system.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 5 illustrates an example declaration for a filtering condition according to some embodiments of the invention.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

As previously discussed, the quality of prediction results from applying machine learning is highly dependent upon the quality of the data that is provided to the machine learning system. The problem is that an abnormal transient state may exist which allows the system to be in an operationally acceptable condition, but where any data collected from the system while in that state is likely to include data outliers that will create a less-than-accurate prediction model.

This is because outliers and other anomalous data have the potential to infiltrate training datasets collected from target systems during monitoring. When the monitored system undergoes some detrimental event, the sensory data collected around this period tends to exhibit numerical values beyond their normally acceptable ranges. For example, in clustered database systems, during scheduled procedures like starting and shutting instances or during nonscheduled procedures like node failover events, monitored systems can be stressed momentarily beyond acceptable and normal limits. These extreme values can be harmful if used to retrain predictive models.

Figure 1:
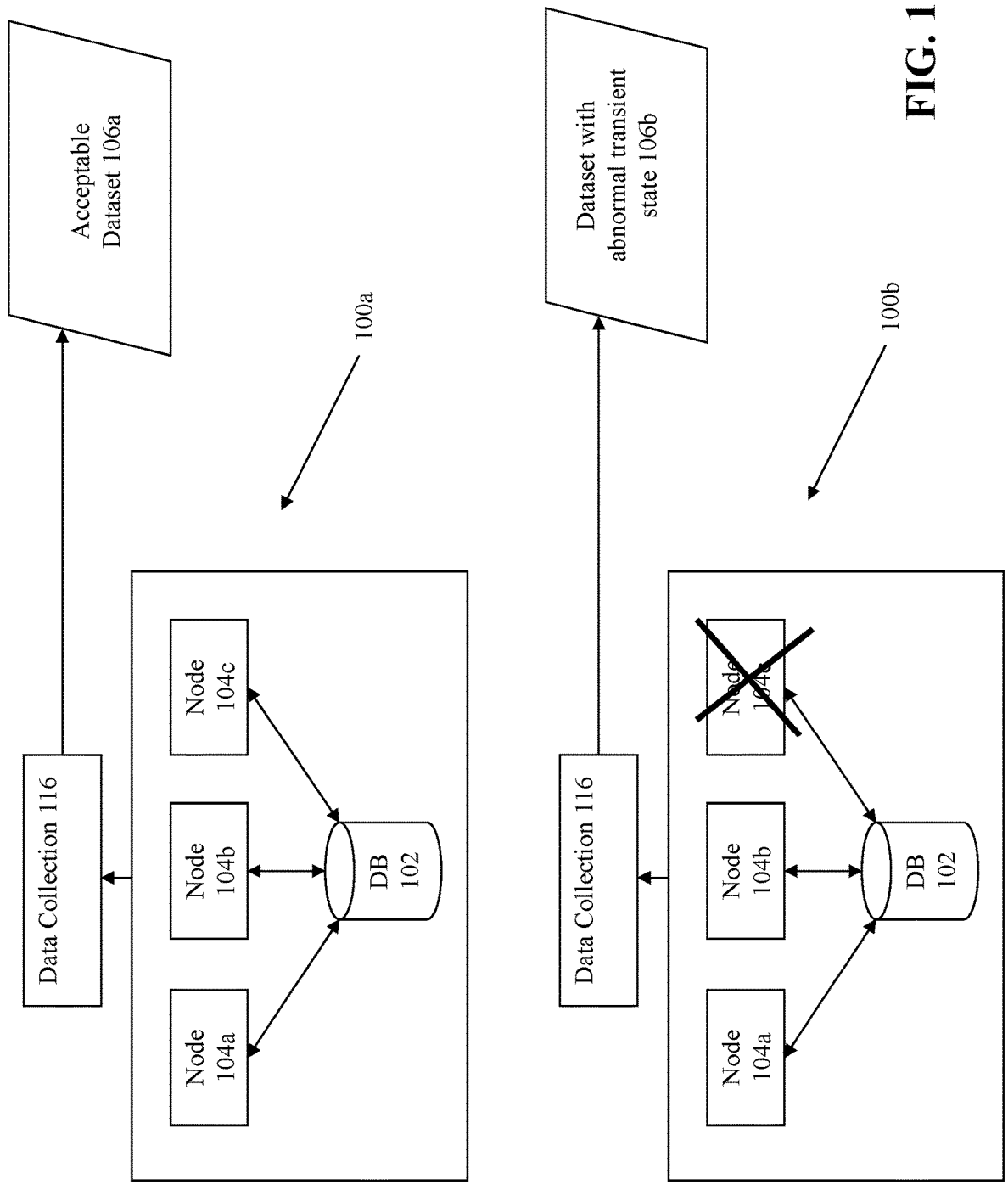
FIG. 1 provides an illustration of a detrimental event situation may occur in a monitored system.

FIG. 1 provides an illustration of when this situation may occur in a monitored system. Scenario 100a shows a system in a normal operation state, where a clustered database system includes three nodes 104a, 104b, and 104c having database instances that that all connected to and access a database 102. In this scenario, a data collector 116 may be collecting data from monitoring this system. Since the system is in a normal operational state, the collected data 106a should be acceptable to be used to generate one or more models for the system.

In contrast, scenario 100b shows the system in an abnormal state, where one of the nodes (node 104c) has gone down. In this situation, it is possible that the other two nodes 104a and 104b that are alive have enough excess capacity such that the overall system is still in an operationally acceptable state. However, even though the overall system is still operational, the abnormal conditions may create various types of data skews such that the collected data 206b from the system should not be acceptable to be used to generate one or more models.

There are numerous types of abnormal states that may cause this type of scenario to occur. For example, as illustrated in FIG. 1, a detrimental event such as a node failure or node eviction may cause an abnormal state that creates data outliers. Another example is when backup operations are occurring in the system, when data pertaining to system resources are in a transient abnormal state due to the backup activities. Yet another example situation for an abnormal state may occur because of software installation activities that occur within the system, e.g., because of system/node resources consumed due to the installation operations and/or due to abnormal numbers of nodes being online/offline because of rolling upgrade processes. Other examples include abnormal network conditions, database instances that go down, and/or various types of intermittent workload fluctuations.

According to some embodiments, outliers are removed by filtering out data correlated to detrimental events within a system. A framework is provided to register and track operational and environmental events that are deemed to have detrimental impacts on the monitored system, and to purge any data samples generated near its vicinity.

Figure 2:
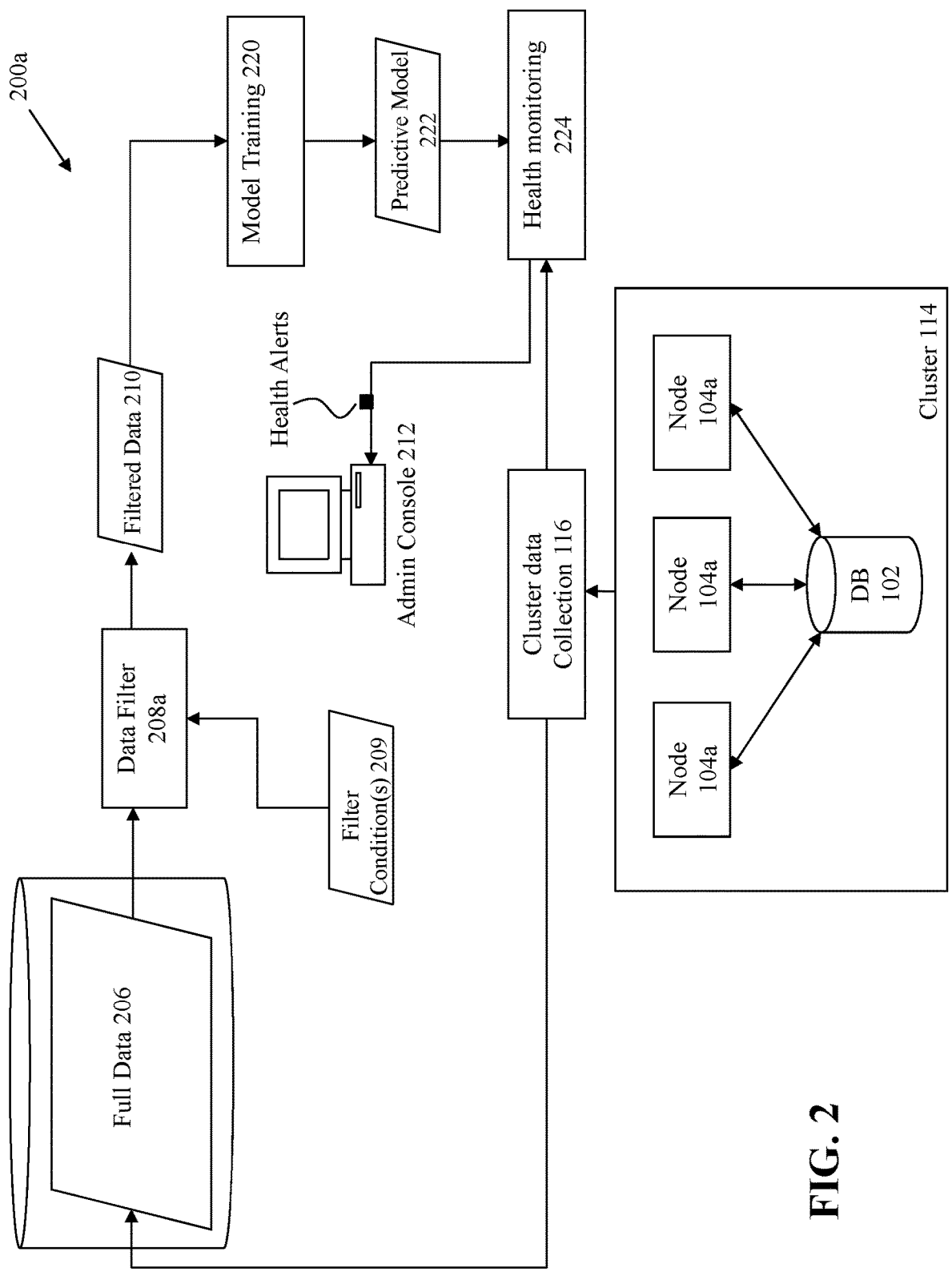
FIG. 2 illustrates a system for filtering data used for calibration of predictive models according to some embodiments of the invention.

FIG. 2 illustrates a system 200a for filtering data used for training of predictive models according to some embodiments of the invention. System 200a includes a data collector 116 that collects signal data from a database system/cluster 114. In the database field, a cluster refers to a system organization in which multiple servers/instances on a plurality of hardware nodes 104a-c connect to a single database 102. In such a system, the full data 106 collected from the database cluster 114 may include intra-node signals corresponding to data for individual nodes (e.g., memory and CPU utilization), inter-node signals that may correlate to behavior or activity pertaining to nodes (e.g., certain types of networking data), as well as database-centric signals that apply to the database-related components (e.g., database logging signals). That collected data 206 may be stored into any suitable type of data storage device, mechanism, or datastore.

The system includes one or more filter mechanisms that filter out data correlated to detrimental events within a system. The system registers and tracks operational and environmental events that are deemed to have detrimental impacts on the monitored system. When any of these events are detected, a tag/timestamp will be produced and used to purge any data samples generated near its vicinity.

In particular, when the monitored systems (targets) are operating under some hazardous conditions, some of its collected signals 206 are expected to show outlier values. A hazardous condition could be any event that exerts unpropitious circumstances upon the monitored target, and typically manifest itself as unjustifiable extreme magnitudes of the collected metrics. For example, when a node is evicted from the cluster and its existing workload is being transitioned over to the surviving nodes, a temporary and unusual strain occurs and needs to be dealt with by the surviving nodes. For the duration of such events, many of the signals observed values, sampled from the impacted targets, could assume extreme ranges that would adversely impact the re-training process and render the resulting new models invalid.

In implementing the present embodiment, a set of signals is identified with direct correlation to various detrimental events. A filter 208a receives one or more filter conditions 209, which correspond to declarations that indicate the name of signals, and their particular ranges, that are indicative of detrimental events. The filter 208a would then scan all candidate data sets looking for any datapoint that might be a manifestation of any of the given detrimental events. If found, the filter will then delete the datapoint as well as a prescribed number of preceding and/or subsequent datapoints to generate filtered dataset 210. This approach therefore cleanses the training data from any pre or post perturbations that might accompany the detrimental event.

The cleansed training data 210 is provided to a model training process 220, such as a supervised learning algorithm. The learning algorithm takes in the supplied set of input data 210 (as well as known outputs), and uses that data to train one or more models 222 that generates predictions in response to new data. Any suitable approach can be taken to perform model training for any suitable model type, including for example, decision trees, discriminant analysis, support vector machines, logistic regression, nearest neighbors, and/or ensemble classification models.

The predictive models 222 can be created and applied to perform many types of analysis tasks upon a system. For example, the predictive models 222 can be applied to perform health monitoring 224 for the database cluster 114. In this approach, the machine learning system performs automatic processing and transformation of large and extensive volumes of raw sensory and other diverse measurement data from the database cluster 114, where the learning model serves as the primary predictor and indicator of many of the database cluster aspects (e.g., current and predicted health state, and system availability). For example, applying the models 222 to perceived measurement data, events can be detected that potentially correlate to cluster health and performance states. Classified behavior can be identified that may be deemed to be normal behavior or some form of abnormal, anomalous, or fault behavior. Identification of abnormal/anomalous/fault behavior could result in generation of a health alert that is provided to the user or administrator, e.g., by way of messaging that is sent to the administrative console 212.

Figure 3:
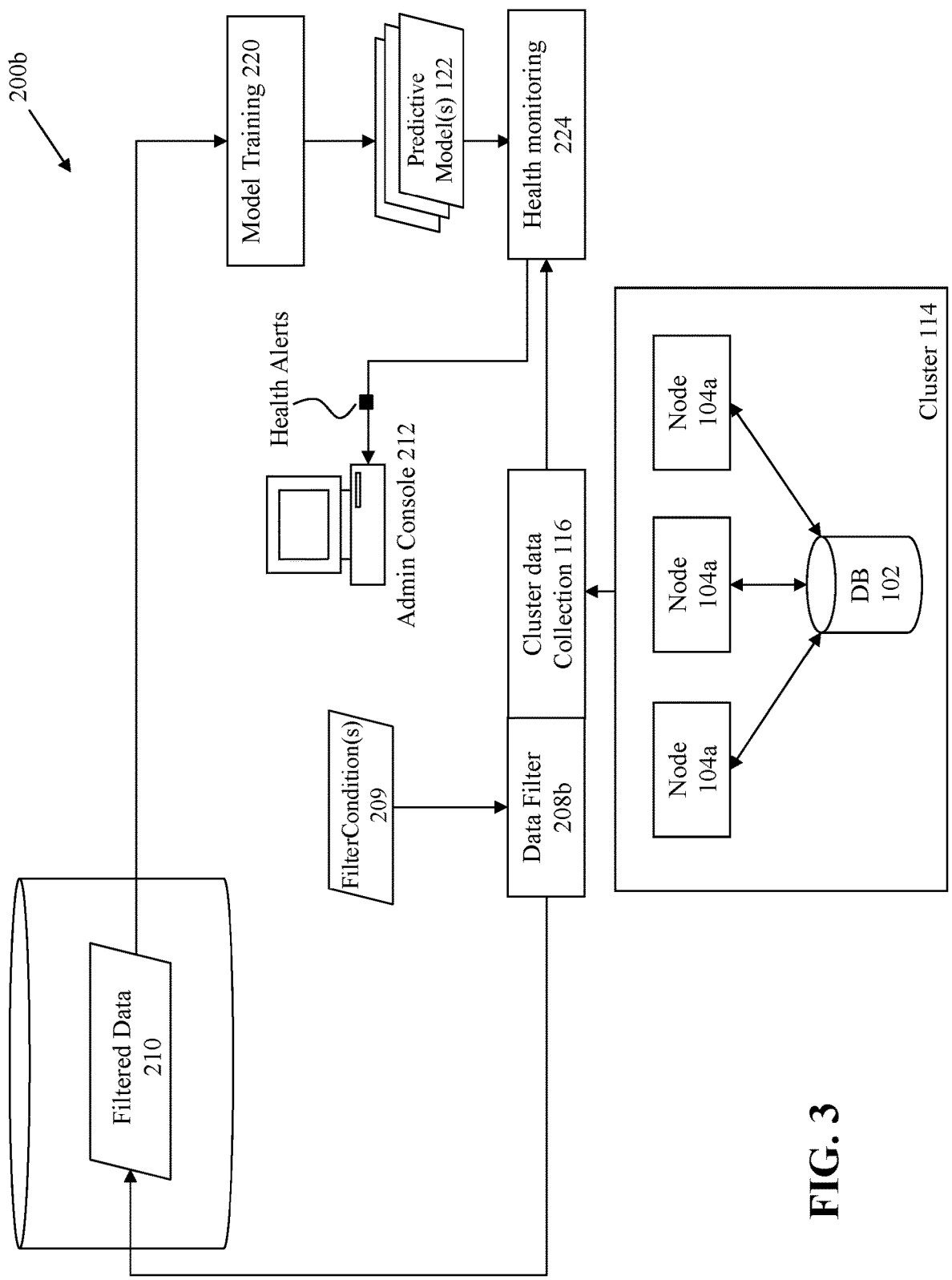
FIG. 3 illustrates an alternate system for filtering data used for calibration of predictive models according to some embodiments of the invention.

While the approach of FIG. 2 filters out outlier data after the full set of data has already been collected, FIG. 3 illustrates an alternate embodiment of system 200b where the data is filtered during the collection process itself. Here, the data filter 208b operates same/similar to the approach described above with respect to FIG. 2, except that it applies in a pre-processing action to generate the filtered dataset 210 prior to being stored and passed on for model training. In some embodiments, this approach can operate as a "phase determiner" that identifies phases within the monitored data for purposes of determining which outlier phases should be excluded from data collection and/or storage.

Figure 4:
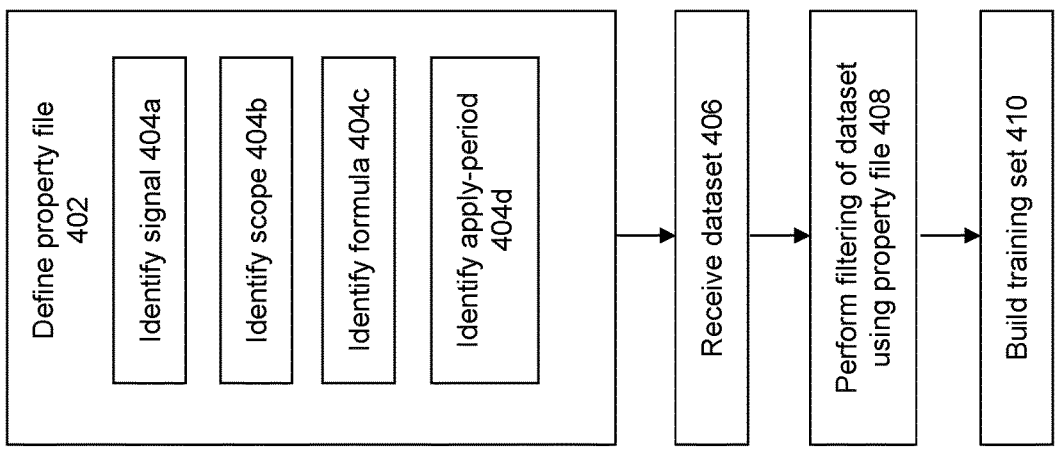
FIG. 4 shows a flowchart of an approach to implement filter processing according to some embodiments of the invention.

FIG. 4 shows a flowchart of an approach to implement filter processing according to some embodiments of the invention. At 402, a property file is defined that identifies one or more Detrimental Environment Conditions (DEC) with respect to those abnormal transient states that a monitored system may fall into due to environmental and other external acts rather than to its own intrinsic operations. For example, in a database cluster when an instance (or a node) is leaving or joining the group then other instances may experience unseasonable deviations from expected behavior patterns, such deviation is attributed, in part or in whole, to perturbations caused by that environment condition itself. The identification and detection of DECs can benefit both the monitoring and training processes. For the monitoring process DECs can augment the diagnostics by offering explanation to the raised alarms. For the training process, a DEC would serve as a marker to guide the applications of flat or hierarchical filtering to nearby data, where this guards against the incorporation of anomalous data into the training and model generation process. The definition of the property file may include identification of the applicable signal/event at 404a, identification of a filtering scope at 404b, identification of a condition formula at 404c, and identification of an apply-period at 404d.

An implementation of some embodiments of the invention may choose to have two parts, declarative and procedural. The declarative part serves to introduce new definitions of detrimental conditions; the procedural part performs the actual filtering in a fashion as prescribed by the declaration.

For example, as shown in FIG. 5, the declaration prototype example 502 takes the implementation form of a property, e.g., a Java property, that includes a signal/event name, a scope, a formula, and an apply period.

The event name portion is used to identify the name of the signal that indicates this detrimental condition instance. This may pertain to any signal collectible within the system.

The scope portion identifies the intended scope of the filtering for a given DEC. In some embodiments, the scope portion may correspond to a "Global" (G), "Local" (L), and/or "Intermediate" (I) value. The local scope relates to situations where the event is pertinent to or impacts only a local node/instance, and thus only local values may need to be filtered from the datasets. In particular, this scope level can be used to restrict the scope of filtering only to local level where the condition is found true. The global scope relates to situations where the event occurs or pertains to multiple nodes and/or instances, and thus some or all of the data from the entire system may be purged because of the event. For example, the global scope will set the scope of filtering to include all levels of the monitored target's component hierarchy. The intermediate scope relates to situations where the event affects multiple nodes/instances, but potentially does not globally affect all components within the system. For example, certain events may affect all components at the same level of the system hierarchy, but do not affect other components at other levels of the system hierarchy.

The formula portion can be implemented as a formulaic declaration of values and/or ranges where a given signal name should be considered as a DEC. According to some embodiments, an implementation of the formula may use basic mathematical comparing operators (such as ==, !=, >=, and/or <=) to check whether a given condition is present.

The apply period portion is used to specify the number of data points to apply the filter, before and after the DEC condition turns true. This expansion is to address operational activities within computing systems that are known to "lead" or "lag" visible metrics for certain indicators, and thus expansion of the datapoints serve to make sure that a comprehensive-enough filters of the signal will occur for such leads/lags before and/or after the identified condition is detected.

Declaration 504 in FIG. 5 shows an example pertaining to a very specific wait event—a "parallel_recovery_coord_wait_for_reply" event. This declaration indicates that the scope of the filtering should this event be detected should be global, where the scope of filtering includes all levels of the monitored target's hierarchy. The formula component for this declaration indicates that the condition for the event is met if the signal value is greater than or equal to 200 (>=200). The apply period component (5:5) states that for this particular DEC, five data points before the DEC condition is true and five data points after the DEC condition it turns false should be subject to filtering.

Returning back to FIG. 4, the next step at 406 is to receive the collected data, where signal data is collected from the target entity being monitored, such as a database instance, processing node, and/or server. A datapoint that is collected from the monitored target may include tens or even hundreds of signals and an array of their sampled data (e.g. observed values).

At 408, filtering is then performed on the collected data using the property file. A determination is made whether any of the signals collected from the monitored system corresponds to a DEC. The information described with respect to FIG. 5 applied to each pertinent signal to identify whether the filter conditions have been met. If so, then the scope of filtering is identified and applied to purge the dataset from the identified outliers.

Since filtering is applied to reduce the whole set of collected data to a smaller set of relevant data for training purposes (e.g., to remove outliers corresponding to transient detrimental conditions), this means that less data needs to be placed into a storage device (such as memory or persistent storage), and allowing for more efficient and faster computations to be applied against that data to generate a training model.

At this point, at 410, the training set can be constructed from the data that has been purged of the outlier data. This action therefore cleanses the training data of any undesired anomalous patterns. At this point, the cleansed dataset can be used to generate the training models.

According to some embodiments, the invention may be implemented in a cluster health advisor system (which may be referred to herein as a "Cluster Health Advisor" or "CHA") that employs supervised learning techniques to provide proactive health prognostics. The health advising system performs online monitoring for the health status of complex systems database instances and hosts systems in real time. This system leverages an integrated battery of advanced, model-driven, pattern recognition and automatic problem diagnostic engines to accomplish its monitoring tasks.

Figure 6:
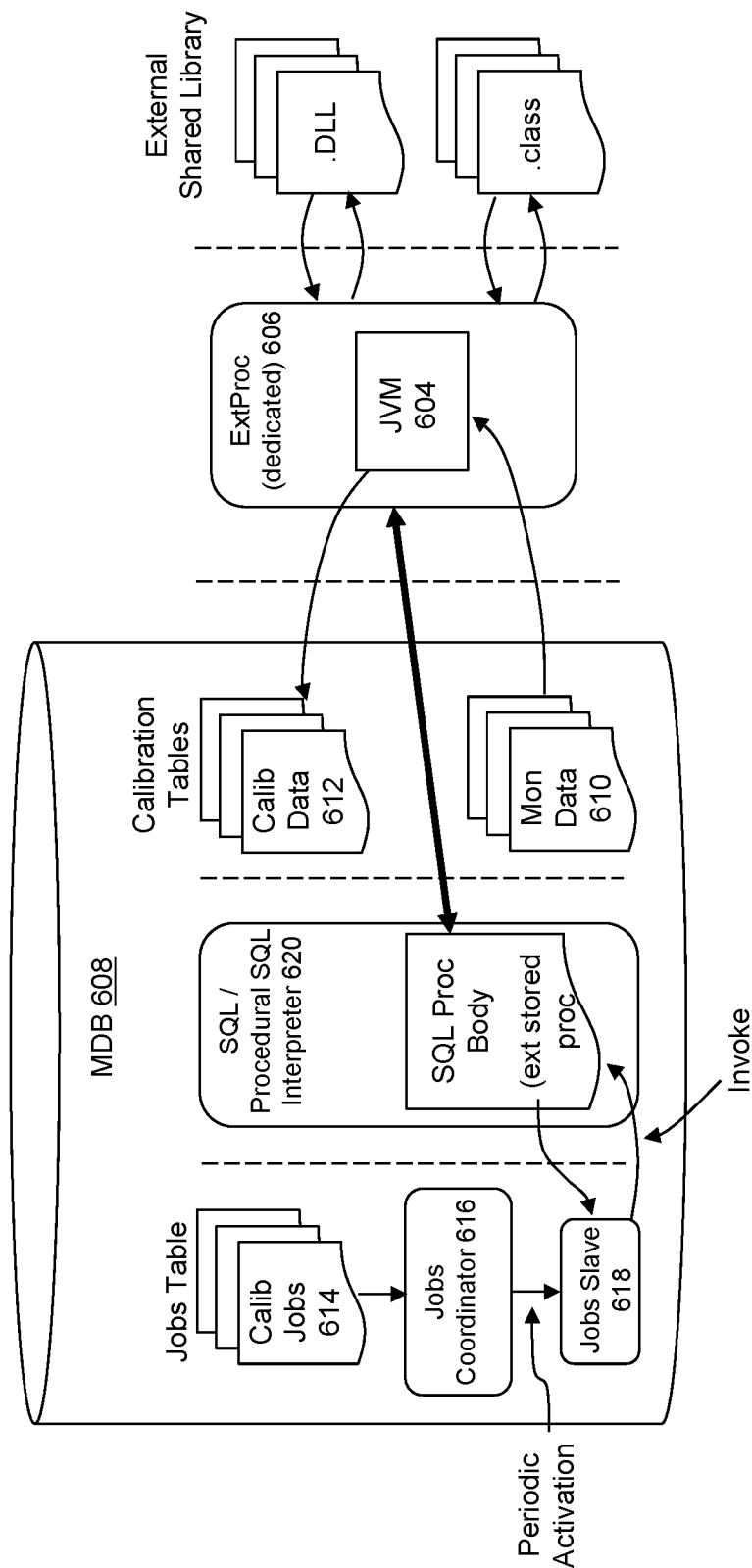
FIG. 6 illustrates the major processes in the health advising system in one embodiment.

FIG. 6 illustrates the major components in the health advising system in one embodiment, and their overall interactions responsible for the treatment of training data and the generation of predictive models. Core functionality is implemented by a set of Java classes installed on every host where the Management Datastore (MDB) 608 is expected to run. These classes execute inside a java virtual machine (JVM) 604 that is contained within a dedicated external process (EXTPROC) agent process 606 (e.g., the JVM runs in same machine as the MDB 608 but is external to the MDB 608), thus allowing for more flexibility in terms of what JVMs to choose from, e.g., to address hot spots for the JVMs. Additionally, the execution is isolated from the MDB 608, and hence does not adversely impact the performance or reliability characteristics of the MDB 608. The EXTPROC 606 will be spawned directly by the database server and it will last as long as needed by a job to scan the system.

The monitoring data 610 is collected and stored in the MDB 608. The collected data 610 may be subject to various factors that cause values to often reach outlier levels. A preprocessing step is thus employed to effectively cleanse the training data from all of these anomalies and outliers before it can be used for model training. In some embodiments, the training data is treated in an automatic way to ready it for model training with minimal user intervention. While this process is typically conducted in the industry by manual means and exclusively by experts in statistics and machine learning, the above-described embodiments provide approaches to implement this even where some intended users may lack such expertise.

Health monitoring is performed for critical subsystems of the clustered systems, including for example, the database instance and the host system. It is noted that additional cluster systems may be supported as well. The system is architected using software components that work together in tandem to determine and track the health status of the monitored system, where the components periodically sample wide variety of key measurements from the monitored system, which will then analyze the stream of observed data in reference to established base models. Anomalous readings (referred to herein as faults) using these approach in a rapid way with a high degree of confidence. Once faults are detected, automatic probabilistic-based problem diagnosis can be invoked, where the system infers the type of the underlying problems and their root causes from the set of faulty readings. Users will be advised with a set of recommended correction actions to alleviate the reported problem(s).

One important task is the proper selection and assignment of predictive-based models to targets. To foster robust analysis, selection is made of a model that can faithfully captures the target's operating modality expected during the monitoring period. Several models can be created for targets that could operate exclusively in significantly different operating modes. Model generation is facilitated by a training process that is sensitive to training data. Once users identify a significant new operating modality of their target, they can generate a new model to be associated with monitoring during this modality. Training data 612 is gathered (e.g., automatically gathered and sorted as per time dimension) during target monitoring. Users are guided to identify and select related and clean training data set for a desirable period when the target was operating within a unique mode.

The evaluation and preparation logic include the periodic scanning of target monitoring data (stored in system's datastore) and their corresponding generated output (e.g. any detected faults and diagnosed problems held in tables of the datastore), highlighting various potential anomalies and outliers that data may contain, and analyzing the data (using robust statistical methods) for its goodness to serve as input to new system's model training. Techniques such as imputation could be applied when necessary to enhance the fidelity of collected data and to improve the quality of new model generation. These specialized components are periodically invoked and driven by a scheduler as a scheduled job at predefined intervals. The high-quality training data produced at the end of each run cycle and the newly calibrated models are added to the datastore. One or more jobs 614 can be accessed by a job coordinator 616, which periodically activates one or more job slaves 618 to perform the training/processing jobs. An interpreter 620 may be used to access a set of procedures, e.g., PL/SQL external procedures, having one or more shared libraries and/or java classes. Their purpose is to collect, analyze, evaluate, cleanse, and transform the data observed during target online monitoring and prepare it into high quality training data. The resulting data is sufficiently adequate for new target predictive-model training.

An additional embodiment pertain to a service-oriented method for cleansing training data used for recalibrating predictive models.

Outliers are known to potentially exist in raw datasets intended for retraining of predictive models in many fields. In particular, sensory data collected from clustered databases may be subject to various sampling and calculation errors and, if left untreated, these errors cause significant harmful variance errors in the generated models. Existing solutions typically require trained statistician experts with domain experience to, mostly manually, validate each individual data point in the dataset and to interpret the mathematical outcomes of some domain-specific statistical analysis tools for validation. This might hamper the widespread adoption of machine learning solutions.

One major improvement provided by some embodiments is the ability for ordinary database DBA's and users, with little or no mathematical and statistical background, to effectively administer the preprocessing of training data, and to remove specious outliers. Typically, this operation requires an expert with statistical and mathematical backgrounds in addition to domain experience. Rather than depending on intrinsic numerical characteristics of training data as the main arbiter for validations, which is the norm in the industry, this method introduces key service performance metrics to adjudicate on the permissible sequences of data to accept it for retraining purposes.

It is noted that a datapoint collected from the monitored target may include tens or even hundreds of signals values that together describe the holistic current state of the target (a target could be a database instance, or its host). In some embodiments, included as part of these signals are additional, critical, values of key performance indicators with corresponding timestamp (examples of such KPI's cpu utilization, database time per user call . . . etc) that end users are familiar with and accustomed with to report the quality of the fundamental services provided by the target systems. An interface is provided to allow users to express the desired ranges of the service quality their business would normally accept.

For example, a CPU utilization range may be chosen to be within 15% and 35%, similarly the DB time per user call could be between 7 msec and 25 msec. The system then calculates the intersection of the set of user-defined KPI ranges (i.e. logical AND) considered together and apply the computed result as a preliminary filter against the whole input dataset. The filtering is performed such that only the datapoints that satisfy the filter would be admitted as candidates for model recalibration, with all others being ignored. Since any one KPI is in fact an aggregation of some QoS aspect of the target, by this definition, none of the individual signals drawn from the same system is expected to assume an anomalous value if the aggregate itself happen to fall within an acceptable range.

Therefore, through the use of declarative and familiar service performance metrics, this approach allows ordinary database users to carry on the tasks of preprocessing training data, a task that is necessary for the successful retraining of machine learning based predictive models in the field. This method, in essence, enables the wide deployment of machine learning products by eliminating the need for highly specific and advanced experience to handle this important task effectively in the field. An example approach to selection of training data for predictive models is described in co-pending U.S. application Ser. No. 15/707, 417, filed on even date herewith, which is hereby incorporated by reference in its entirety.

Another embodiment pertains to a multilevel approach for imputing low to severely sparse and missing data.

Many machine learning algorithms prefer to operate on full datasets without any missing information. In the cases of missing data, the typical expectation is to employ some imputation techniques to patch the dataset offline to make it usable. This is usually performed for data with low degree of missingness (i.e. not exceeding 20%), prompting datasets with sparse information to become almost futile. Simulation is typically used to generate random values modeled after some perceived distributions and is not utilized for imputation purposes.

Some embodiments address this problem by optimally handling missingness not only at low but also greater degrees. At low missingness, the present approach first employs iterative techniques to impute new values while relying heavily on observed data alone. As missingness increases, whether overall or in specific variables, imputation techniques used in the first level begin to lose robustness and become ineffective. The method compensates by adding new data brought from external but closely related sources already kept in either trained models or succinct distribution formats. The compensation using external data is incremental and in proportion to missingness severity. If no observed data can be used, the method handles this case by fully compensating via reliance on external sources.

The present multilevel treatment approach to missing data adapts to the degree of missingness exhibited by the data. For low to moderate missingness (e.g., below 20% of missingness ratio) the approach can make the assumption that missing data is Gaussian and the system employs the Expectation Maximization algorithm to estimate theta and sigma model parameters relying on information presented by the observed data only. Once the model parameters have converged satisfactory, then the approach uses Cholesky decomposition to impute any missing data conditioned on the observed part of the data.

As the missingness ratio increases, the Expectation Maximization (EM) may not converge, or some signals might be totally absent. At this level, the method attempts to re-assemble the signals in subgroups and repeats the EM process to see if it can succeed on any subgroup of the original signals—using only the observed data. The method then "patches" any missing components of the resulting covariance matrix with realistic and reliable values obtained from external resources. If the missing degree is too severe for the patching mechanism to work successfully, the system then resolves to classical simulation using closely related models already constructed from similar data for this purpose. This multilevel approach enables treating data missingness adequately at any of its severity levels while utilizing, as much as possible, the actual observed data.

To allow for the above approach to fall back to some necessary information readied from a reliable external resource, the external resources can be constructed with this purpose in mind, beforehand. An offline statistical analyzer tool can be employed to fine tune a statistical model, iteratively, for any group of signals as newer data is scanned. By feeding the tool a large amount of data it can produce a refined and nicely generalizable model that is used to assist the imputation process as described above.

Therefore, this approach addresses the problem where data for many signals collected from clustered databases were found to be sparse to varying degrees. This method addresses these issues by using a gradient solution that is attentive to imputation needs at each of several missingness levels. The solutions provided by this method facilitates wider deployment and acceptance of machine learning products. An example approach to impute missing data is described in co-pending U.S. application Ser. No. 15/707,500, filed on even date herewith, which is hereby incorporated by reference in its entirety.

Yet another embodiment pertains to an analytical approach to evaluate the quality of datasets for retraining predictive models of clustered databases.

For supervised training of predictive models, the quality of the training data (e.g. in terms of sufficient count of distinct patterns that correctly capture the steady states aspects of target systems) is important for good model retraining. Existing solutions expect human experts to perform the task of validating the quality of the training datasets, mostly in an ad hoc fashion. However, such expert resources cannot be assumed to be available in the field all the time, and this lack of availability might hamper the successful deployment and acceptance of supervised machine learning solutions. Additionally, without some sort of established reference serving as a baseline, numerical analysis methods on their own may not be able to determine if a dataset captures enough normal facets of the target system.

Some embodiments provide a method and system for the introduction of a finite set of analytical terms that can sufficiently describe the information embodied by the patterns found in arbitrarily large training datasets. This set of analytical terms can then be used as the bases for comparisons and used to draw important conclusions about the quality and suitability of the corresponding datasets to retrain predictive models. This approach helps to systematize the preprocessing phase and simplifies model verification.

The approach systematizes a set of key analytical terms, to be derived for any arbitrary large training dataset (e.g. from monitored clustered databases), and then compares the sets themselves to effectively establish similarity scores among their corresponding datasets. This method maps a dataset to its primary clusters and then analyzes the clusters in terms of their count, mutual separation distances, and the overall multidimensional volume they occupy. An automatic evaluation of the suitability of training datasets for model retraining purposes is determined by appraising their own similarity scores to those of established or default datasets.

Therefore, the embodiment provides an approach that simplifies, systematizes, and abridges the model verification processes. It can be utilized by expert users or executed directly when human assistance is limited. This would improve the successful acceptance and market penetration of supervised machine leaning-based solutions.

An additional embodiment pertains to an approach for implementing predictive model selection based on user-defined criteria in clustered databases.

As the compute conditions of target systems may undergo significant transformations over time (e.g., due to changes in workload, configurations, etc.), there exists a need for new models to be plugged in that are more adequate for the new conditions. This raises the issue of what model the user should choose and how to search for it. Current industry solutions tend to require entirely new training in order to satisfy any new conditions. This is, of course, a costly operation and grossly inefficient since it would discard previous model development rather than leverage it.

In particular, when the operating conditions of the monitored system (target) departs away from its current operating state permanently and by a significant magnitude, then the already used models may become inadequate for the new operating state, the user is recommended to update the models and use another and more relevant models.

According to some embodiments, the inventive approach identifies critical operational parameters of target systems and tags newly developed models with these parameters (e.g., values demonstrated by the target systems during periods of training data), thus allowing all successful models to be preserved for future use. The method translates model search and selection exercises into a feature or tag matching problem. Given the new parameters of the target system, this method would then search the library of existing models for the one with the most matching tags.

Rather than initiating a whole re-training process (as it is the typical case in the industry) the user could select from the model library one model that is quite most adequate for the new operating state.

The selection process works as follows: The KPI list and their ranges for generating new models are saved and passed on as tags (features) attached to the new models. The selection process is transformed into a matching problem, e.g., given the new values of desired KPI ranges, workload class and intensity, compute resource configuration find the model with best matching features. The search is heuristic and the outcome list of models is ordered according to their matching score. The user may pick the model with the highest score, or decide to initiate a whole new re-training process if the scores are found to be low.

Therefore, the present approach is able to preserve successfully developed models and leverage them for future use. This offers not only increased operational efficiency, but also helps to reduce down time of machine learning products in the field.

Another embodiment pertains to an approach to implement context-aware prognoses in the health analysis of clustered databases.

Health monitoring solutions in the industry strive to identify the particular component that is the source of their diagnosed faults. In many cases, conventional solutions build some ad hoc logic that are notorious for having low-grade accuracy even under slight behavior drifts in the monitored target. Additionally, they may not cope gracefully well with the prohibitively large amount of input data of today's environment. Solutions exploiting machine learning and predictive models progress towards a finite set of outcomes and they too are not prepared to establish contextual references for any of their diagnoses output.

Some embodiments provide a new context-aware, multi-step prognoses to machine learning-based health monitors and does so by supplementing model-based operations with parallel streams of live detailed data obtained from various parts of the managed system. Streams with usual data content are filtered out and only those with extreme data are allowed to undergo further analysis—signifying the parts that are contributing the most to the undergoing fault prognoses. This filtration helps cope with the expectedly vast volume of incoming data. The streams are further prioritized based on drift and severity of their data content, eventually declaring one, or a few parts, that are highly suspect of being the original source of the diagnosed fault. Context-aware corrective actions can then be derived using a state transition table.

This approach harnesses streams of detailed observations data collected from the monitored target to create context, in parallel to regular model operations, for the model diagnostics and prognostics results. The method supplements model-based operations with parallel streams of live detailed traffic obtained from various components of the monitored system. Streams with usual data content are filtered out and only those with extreme data are allowed to undergo further analysis—signifying the parts that are contributing the most to the undergoing fault prognoses. This filtration helps cope with the expectedly vast volume of incoming data. The streams are further prioritized based on drift and severity of their data content, eventually declaring one, or a few parts, that are highly suspect of being the original source of the diagnosed fault. Context-aware corrective actions can then be derived using a state transition table.

Therefore, the ability of the present embodiment to pinpoint the part, or parts, from where the diagnosed fault first originated is a greatly appreciated feature in any machine learning-based health monitor and, together with a reasonable corrective action, it will enable users to shorten the time to recovery significantly. This will translate to higher acceptance and greater adoption of machine learning solutions. An example approach to implement context-aware prognoses is described in co-pending U.S. application Ser. No. 15/707,536, filed on even date herewith, which is hereby incorporated by reference in its entirety.

Yet another embodiment pertains to an approach to perform pipelining multiple of predictive mini-models together to improve diagnoses and prognoses quality in clustered databases.

To monitor the health of a software component using machine learning techniques, a model that captures the main operational aspects of the component is typically constructed to steer the health diagnosis and prognosis process. Typical modeling approaches tend to construct a dedicated model for each individual software component with great emphasis on the intrinsic features of the target component itself. Important clues from the surrounding environment and other interacting components are mostly left untapped. As such, the prognoses performed in such a compartmentalized fashion with isolated models tend to lack holistic awareness and may produce low-grade outcomes.

According to some embodiments, the present invention constructs composite models that are made of an assemblage of mini-models reflecting on the environment and other external components surrounding the target. The diagnoses and prognoses process would then leverage this holistic awareness and produce outcomes with higher accuracy.

Consider as an example the operations of a database instance. While its intrinsic design and algorithms are expected to constitute the main factors which impact its operational behavior, the state of the operating system that hosts the instance would also have direct impacts on it as well. Such inter-component impact is not thoroughly captured by traditional machine learning model construction techniques, where the training data used in the training of new predictive models for the database instance is made of signals that emanate from the instance itself. The same is true for the operating system models, which gives rise to compartmentalized and semi-isolated diagnoses.

The improvements of the current embodiment in this regard are to replicate the models of all system components the target is dependent on, and to stitch these models in a fashion that reflects their overall topology and service interactions.

When monitoring a database instance as a target, a composite model is used to achieve a consolidated and integrated awareness of the target's state. A model of the host operating system is cloned and attached to the instance own model. Results produced by the host model are propagated as input into the instance model to provide clues about the external but impacting state. More models can be assembled in the same fashion.

To operate this composite model, some or all necessary data are merged together and fed as input during monitoring. Since data merging involves synchronization among all sources of data, the present approach can use time as the synching dimension.

An issue also arises with respect to which particular external models should be selected for the composite model construction. In some embodiments, a cross-reference between the models at their generation phase is preserved as a guiding selection attribute.

Therefore, since the performance of the diagnoses and prognoses process is measured by its accuracy in terms of the rate of false positives and false negatives in the outcome decision, the present approach can be applied to significantly improve the accuracy of the diagnoses and prognoses processes that are built with machine learning techniques.

Another embodiment pertains to an approach for implementing online performance assessment of predictive models.

There is a risk of dealing with false outcomes neglectfully if the performance of applied predictive models is not regularly verified. To handle this problem, some in the industry may choose to retire their models periodically after a certain period of time, say three to six months from their deployment, and generate new ones. However, there are no commonly established processes in the industry to validate and possibly retire machine learning-based predictive models after they have been deployed.

According to some embodiments, the invention provides comparative analysis and tracking of long-term residual behavior of active models to determine if a persistent drift expands beyond an acceptable threshold. The governing assumptions underpinning the algorithms of this method follow that any fault in the target system would not last for extended periods and that, in general, model diagnostic findings should be corroborated by the target key performance indicator.

In order to make sure that online predictive models continue to perform reasonably well, the approach evaluates their performance continually while they are plugged into operation. The performance assessment method is employed to implement the continual sizing up of a model's residuals and the degree of correlations between the models' output decisions and the projections of the target's key performance indicators.

All (or a significant amount of) diagnostics and prognostic data produced by the model, as well as the monitoring data, can be stored in a central database alongside the key performance indicators. When the model is performing well, its residuals tend to resemble those produced with the validation dataset—except when failures are detected. The KPI's readings, on their part, would corroborate the models' diagnostics and prognostics findings.

When operational models begin to lose their effectiveness, either gradually or otherwise, their residuals become distinctively worse than usual. The challenge is on how to correctly differentiate between cases of bad residuals caused by model lack of efficacy (what is the main concern) versus the case of what could be the manifestations of temporary failures. The present methodology builds on a simple assumption that real faults on the monitored target will not continue to exist for an extended period of time (otherwise it will defeat the purpose of having the target as a useful service provider). In other words, if the residuals time series is segmented into small contiguous chunks, then any impermanent faults would have resulted in a small/finite number (but not all) of unusual residual chunks. The majority would therefore reflect the long term changes in the monitored system behavior.

This approach therefore greatly enhances the operational quality of machine learning solutions, as well as establishes robust measures to track the performance of active predictive models. This allows the system to create alerts when these models become inadequate as their target system conditions change significantly over time. It will also help keep the machine learning product well-performing and reduces the chances of false results.

Therefore, what has been described is an improved approach to remove outliers by filtering out data correlated to detrimental events within a system. One or more detrimental even conditions are defined to identify and handle abnormal transient states from collected data for a monitored system.

The inventive techniques can be applied to perform proactive health prognostics for a clustered computing system using supervised learning techniques, which are applied to implement a model-driven, pattern recognition and automatic problem diagnostic engine to accomplish its monitoring tasks for the clustered system.

System Architecture Overview

Figure 7:
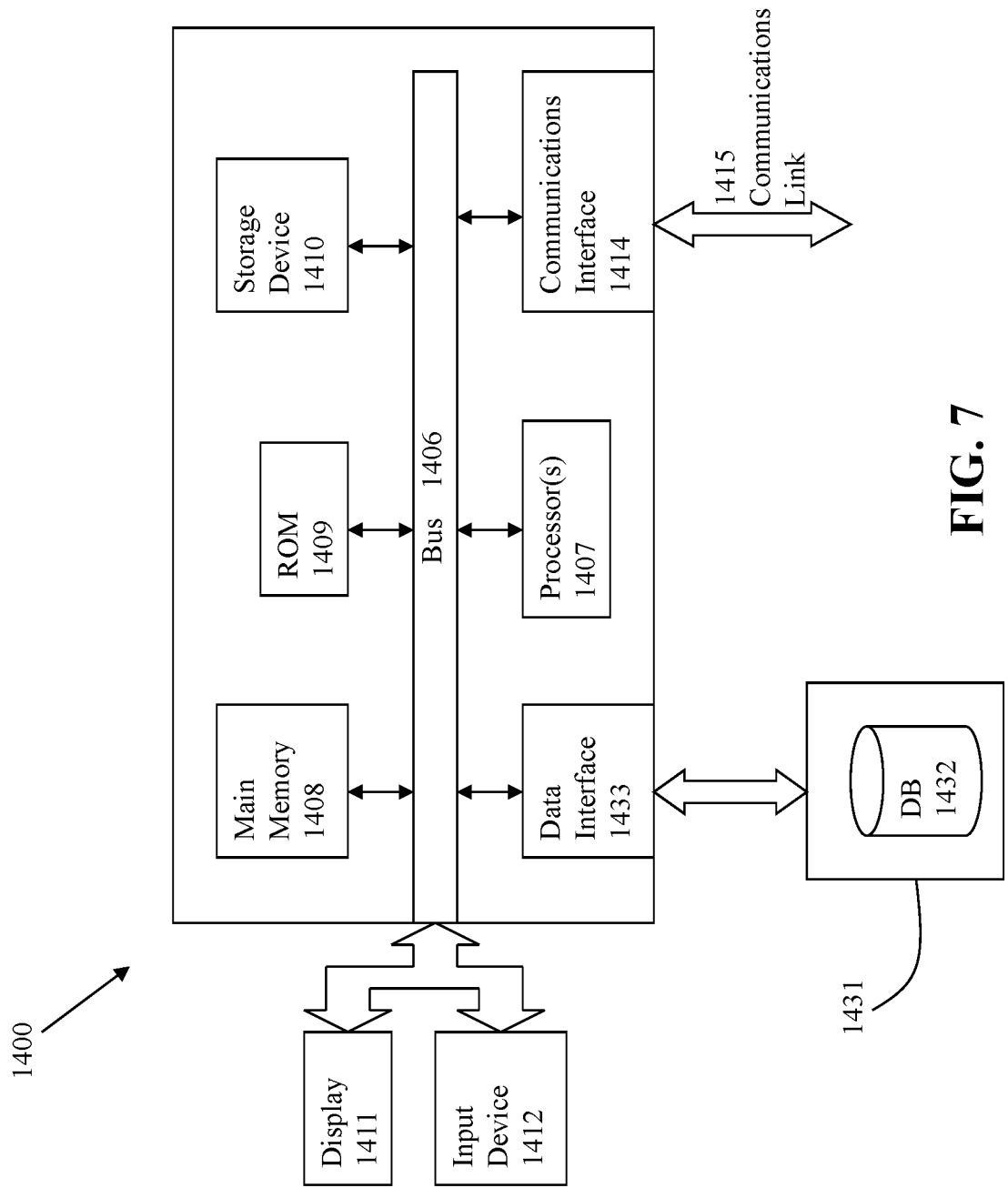
FIG. 7 is a block diagram of an illustrative computing system suitable for implementing an embodiment of the present invention.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 8:
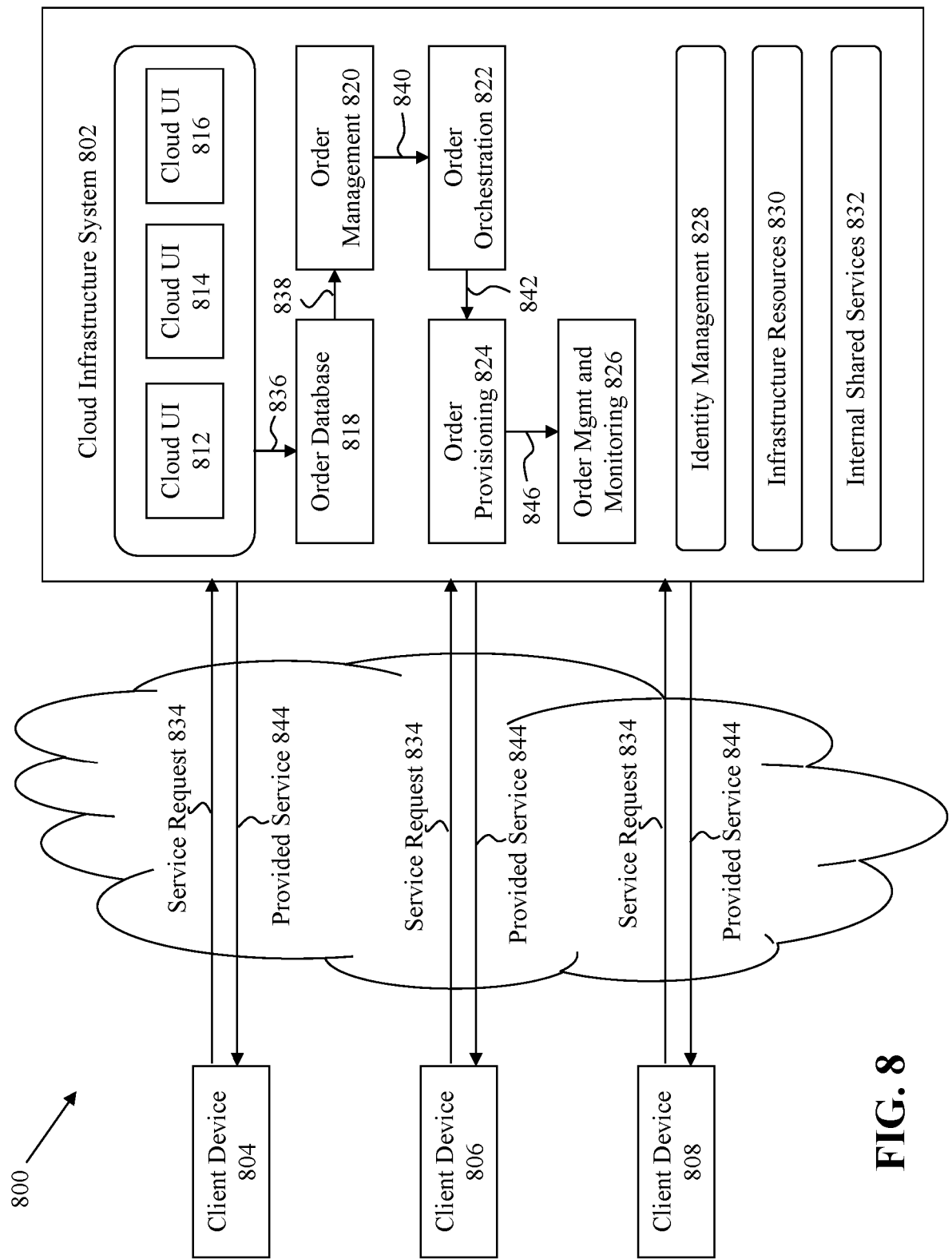
FIG. 8 is a block diagram of one or more components of a system environment in which services may be offered as cloud services, in accordance with an embodiment of the present invention.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 7. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method for generating training data for a machine learning system, comprising:
   collecting first data pertaining to a first computing node and second data pertaining to a second computing node in a clustered database system;
   identifying an abnormal state of the first computing node in the clustered database system;
   identifying one or more filter conditions that correspond to the abnormal state, wherein
      the one or more filter conditions are defined with a declaration that includes a signal name, a scope, and an apply period,
      the apply period includes a filter range that comprises an ordered pair, and
      the ordered pair comprises a first component indicative of a first number of datapoints generated before the one or more filter conditions for the abnormal state turn true and a second component indicative of a second number of datapoints generated after the one or more filter conditions for the abnormal state turn false;
   prior to training a predictive model with training data for the clustered database system, performing a set of acts that comprises:
      filtering out a first portion of the first data pertaining to the abnormal state of the first computing node; and
      after the second computing node has been determined to be in a normal state during a time period corresponding to the abnormal state of the first computing node, filtering out a second portion of the second data pertaining to the second computing node within the time period during which the second computing node is determined to be in the normal state on a basis that the time period corresponds to the abnormal state of the first computing node; and
   training the predictive model at least by providing the predictive model with the training data from which the first portion of the first data and the second portion of the second data have been filtered out.

2. The method of claim 1, further comprising removing at least one of a preceding datapoint and a subsequent datapoint from the first portion of the first data or the second portion of the second data to generate the training data.

3. The method of claim 1, wherein a scope is defined for one or more filter conditions that correspond to the abnormal state for filtering out the first portion or the second portion, the scope identifies an extent to which filtering is applied upon detection of the abnormal state, and the extent comprises a number of computing nodes whose data is subject to the one or more filter condition.

4. The method of claim 3, wherein the scope corresponds to at least one of a global scope where filtering is applied to all levels of a component hierarchy of the clustered database system, a local scope where filtering is applied only to a local level of the second computing node at which the abnormal state occurs, or an intermediate scope where filtering is applied to multiple computing nodes or multiple instances but not all computing nodes or all instances of the clustered database system.

5. The method of claim 1, wherein filtering is applied as a pre-processing action when collecting the first and the second data and before persistently storing at least some of the data that has been collected for training the predictive model.

6. The method of claim 1, wherein the training data comprises only normal operating data when the clustered database system operates in a normal operation state and also excludes the second portion of the second data representing the second computing node in the normal operation state, the abnormal state corresponds to a system maintenance task or a failure, and the predictive model is applied to perform health monitoring of the clustered database cluster.

7. The method of claim 1, wherein the time period within which the second computing node is determined to be in the normal state corresponds to the abnormal state of the first computing node in that the time period includes at least one of a first time period before detection of the abnormal state, a second time period during which the first computing node is determined to be in the abnormal state, or a third time period after a determination that the abnormal state has ceased to exist.

8. A system for generating training data for a machine learning system, comprising:
   a processor; and
   a memory for holding programmable code, wherein the programmable code includes instructions which, when executed by the processor, cause the processor to perform a set of acts for collecting data from a clustered database system, the set of acts comprising:
   collecting first data pertaining to a first computing node and second data pertaining to a second computing node in the clustered database system;
   identifying an abnormal state of the first computing node in the clustered database system;
   identifying one or more filter conditions that correspond to the abnormal state, wherein
      the one or more filter conditions are defined with a declaration that includes a signal name, a scope, and an apply period,
      the apply period includes a filter range that comprises an ordered pair, and
      the ordered pair comprises a first component indicative of a first number of datapoints generated before the one or more filter conditions for the abnormal state turn true and a second component indicative of a second number of datapoints generated after the one or more filter conditions for the abnormal state turn false;
   prior to training a predictive model with training data for the clustered database system, performing a set of acts that comprises:
      filtering out a first portion of the first data pertaining to the abnormal state of the first computing node; and
      after the second computing node has been determined to be in a normal state during a time period corresponding to the abnormal state of the first computing node, filtering out a second portion of the second data pertaining to the second computing node within the time period during which the second computing node is determined to be in the normal state on a basis that the time period corresponds to the abnormal state of the first computing node; and
   training the predictive model at least by providing the predictive model with the training data from which the first portion of the first data and the second portion of the second data have been filtered out.

9. The system of claim 8, wherein the programmable code further includes instructions for removing at least one of a preceding datapoint and an antecedent datapoint from the first portion of the first data or the second portion of the second data to generate the training data.

10. The system of claim 8, wherein a scope of defined for one or more filter conditions that correspond to the abnormal state for filtering out the first portion or the second portion, the scope identifies an extent to which filtering is applied upon detestation of the abnormal state, and the extent comprises a number of computing nodes whose data is subject to the one or more filter condition.

11. The system of claim 10, wherein the scope corresponds to at least one of a global scope where filtering is applied to all levels of a component hierarchy of the clustered database system, a local scope where filtering is applied only to a local level of the second computing node at which the abnormal state occurs, or an intermediate scope where filtering is applied to multiple computing nodes or multiple instances but not all computing nodes or all instance of the clustered database system.

12. The system of claim 8, wherein filtering is applied as a pre-processing action when collecting the first and the second data and before persistently storing at least some of the data that has been collected for training the predictive model.

13. The system of claim 8, wherein the training data comprises only normal operating data when the clustered database system operates in a normal operation state and also excludes the second portion of the second data representing the second computing node in the normal operation state, the abnormal state corresponds to a system maintenance task or a failure, and the predictive model is applied to perform health monitoring of a database cluster.

14. A computer program product embodied on a non-transitory computer readable medium having stored thereon a sequence of instructions which, when executed by a processor, causes the processor to perform a set of acts, the set of acts comprising:
   collecting first data pertaining to a first computing node and second data pertaining to a second computing node in a clustered database system;
   identifying an abnormal state of the first computing node in the clustered database system;
   identifying one or more filter conditions that correspond to the abnormal state, wherein
      the one or more filter conditions are defined with a declaration that includes a signal name, a scope, and an apply period,
      the apply period includes a filter range that comprises an ordered pair, and
      the ordered pair comprises a first component indicative of a first number of datapoints generated before the one or more filter conditions for the abnormal state turn true and a second component indicative of a second number of datapoints generated after the one or more filter conditions for the abnormal state turn false;
   prior to training a predictive model with training data for the clustered database system, performing a set of acts that comprises:
      filtering out a first portion of the first data pertaining to the abnormal state of the first computing node; and
      after the second computing node has been determined to be in a normal state during a time period corresponding to the abnormal state of the first computing node, filtering out a second portion of the second data pertaining to the second computing node within a time period during which the second computing node is determined to be in a normal state on a basis that the time period corresponds to the abnormal state of the first computing node; and
   training the predictive model at least by providing the predictive model with the training data from which the first portion of the first data and the second portion of the second data have been filtered out.

15. The computer program product of claim 14, wherein the sequence of instructions, when executed by the processor, cause the processor to perform the set of acts that further comprises removing at least one of a preceding datapoint and an antecedent datapoint from the first portion of the first data or the second portion of the second data to generate the training data.

16. The computer program product of claim 14, wherein a scope of defined for one or more filter conditions that correspond to the abnormal state for filtering out the first portion or the second portion, the scope identifies an extent to which filtering is applied upon detestation of the abnormal state, and the extent comprises a number of computing nodes whose data is subject to the one or more filter condition.

17. The computer program product of claim 16, wherein the scope corresponds to at least one of a global scope where filtering is applied to all levels of a component hierarchy of the clustered database system, a local scope where filtering is applied only to a local level of the second computing node at which the abnormal state occurs, or an intermediate scope where filtering is applied to multiple computing nodes or multiple instances but not all computing nodes or all instances of the clustered database system.

18. The computer program product of claim 14, wherein filtering is applied as a pre-processing action when collecting the first and the second data and before persistently storing at least some of the data that has been collected for training the predictive model.

19. The computer program product of claim 14, wherein the training data comprises only normal operating data when the clustered database system operates in a normal operation state and also excludes the second portion of the second data representing the second computing node in the normal operation state, the abnormal state corresponds to a system maintenance task or a failure of the second computing node, and the predictive model is applied to perform health monitoring of a database cluster.

\* \* \* \* \*

UNITED STATES PATENT AND TRADEMARK OFFICE
CERTIFICATE OF CORRECTION

PATENT NO. : 11,308,049 B2
APPLICATION NO. : 15/707454
DATED : April 19, 2022
INVENTOR(S) : Suleiman et al.

Page 1 of 1

It is certified that error appears in the above-identified patent and that said Letters Patent is hereby corrected as shown below:

On the Title Page

Column 2, under Abstract, Line 3, delete "even" and insert -- event --, therefor.

On page 3, Column 1, under Other Publication, Line 42, delete "IEE" and insert -- IEEE --, therefor.

In the Specification

In Column 1, Line 50, delete "the of" and insert -- of --, therefor.

In Column 3, Line 65, delete "that that" and insert -- that --, therefor.

In Column 15, Line 25, delete "even" and insert -- event --, therefor.

Signed and Sealed this
Twenty-seventh Day of September, 2022

Katherine Kelly Vidal
*Director of the United States Patent and Trademark Office*